United States Patent
Yoshimi

(10) Patent No.: US 12,272,035 B2
(45) Date of Patent: Apr. 8, 2025

(54) MACHINE LEARNING DEVICE, MACHINE LEARNING METHOD, AND RECORDING MEDIUM STORING MACHINE LEARNING PROGRAM

(71) Applicant: NEC Corporation, Tokyo (JP)

(72) Inventor: Kosuke Yoshimi, Tokyo (JP)

(73) Assignee: NEC CORPORATION, Tokyo (JP)

(*) Notice: Subject to any disclaimer, the term of this patent is extended or adjusted under 35 U.S.C. 154(b) by 392 days.

(21) Appl. No.: 17/778,576

(22) PCT Filed: Nov. 25, 2019

(86) PCT No.: PCT/JP2019/045908
§ 371 (c)(1),
(2) Date: May 20, 2022

(87) PCT Pub. No.: WO2021/106028
PCT Pub. Date: Jun. 3, 2021

(65) Prior Publication Data
US 2022/0405894 A1    Dec. 22, 2022

(51) Int. Cl.
*G06T 5/00*    (2024.01)
*G06T 3/60*    (2024.01)
*G06T 5/77*    (2024.01)

(52) U.S. Cl.
CPC .................. *G06T 5/77* (2024.01); *G06T 3/60* (2013.01); *G06T 2207/20081* (2013.01)

(58) Field of Classification Search
CPC .... G06T 5/77; G06T 3/60; G06T 2207/20081
(Continued)

(56) References Cited

U.S. PATENT DOCUMENTS

2009/0284589 A1*  11/2009  Radeva .................. G06T 7/0012
                                                            382/128
2010/0239123 A1*   9/2010  Funayama .............. G06T 7/251
                                                            382/173
(Continued)

FOREIGN PATENT DOCUMENTS

JP    2009-181306 A    8/2009
JP    2011-059810 A    3/2011
(Continued)

OTHER PUBLICATIONS

International Search Report for PCT Application No. PCT/JP2019/046908, mailed on Jan. 7, 2020.
(Continued)

*Primary Examiner* — Allen H Nguyen
(74) *Attorney, Agent, or Firm* — Sughrue Mion, PLLC

(57) ABSTRACT

This machine-learning device is provided with: a detection unit which detects a loss of consistency with a lapse of time in a determination result for unit data, the determination result being output from a determination unit that generates a learning model to be used when performing prescribed determination for one or more pieces of the unit data that form time series data; and a selection unit which selects, on the basis of the result of detection by the detection unit, unit data to be used as teacher data when the determination unit updates the learning model, thereby efficiently raising the accuracy of the learning model when machine learning is performed on the basis of the time series data.

18 Claims, 11 Drawing Sheets

(58) Field of Classification Search
USPC .......................................................... 382/156
See application file for complete search history.

(56) References Cited

U.S. PATENT DOCUMENTS

| | | | |
|---|---|---|---|
| 2013/0084008 A1* | 4/2013 | Othmezouri | G06T 7/11 |
| | | | 382/180 |
| 2016/0098636 A1* | 4/2016 | Okonogi | G06N 20/00 |
| | | | 706/12 |
| 2018/0137628 A1* | 5/2018 | Shoda | G06T 7/246 |

FOREIGN PATENT DOCUMENTS

| | | |
|---|---|---|
| JP | 2016-076073 A | 5/2016 |
| JP | 2018-081545 A | 5/2018 |
| JP | 2018-537798 A | 12/2018 |

OTHER PUBLICATIONS

English translation of Written opinion for PCT Application No. PCT/JP2019/045908, mailed on Jan. 7, 2020.
JP Office Action for JP Application No. 2021-560763, mailed on Apr. 4, 2023 with English Translation.

* cited by examiner

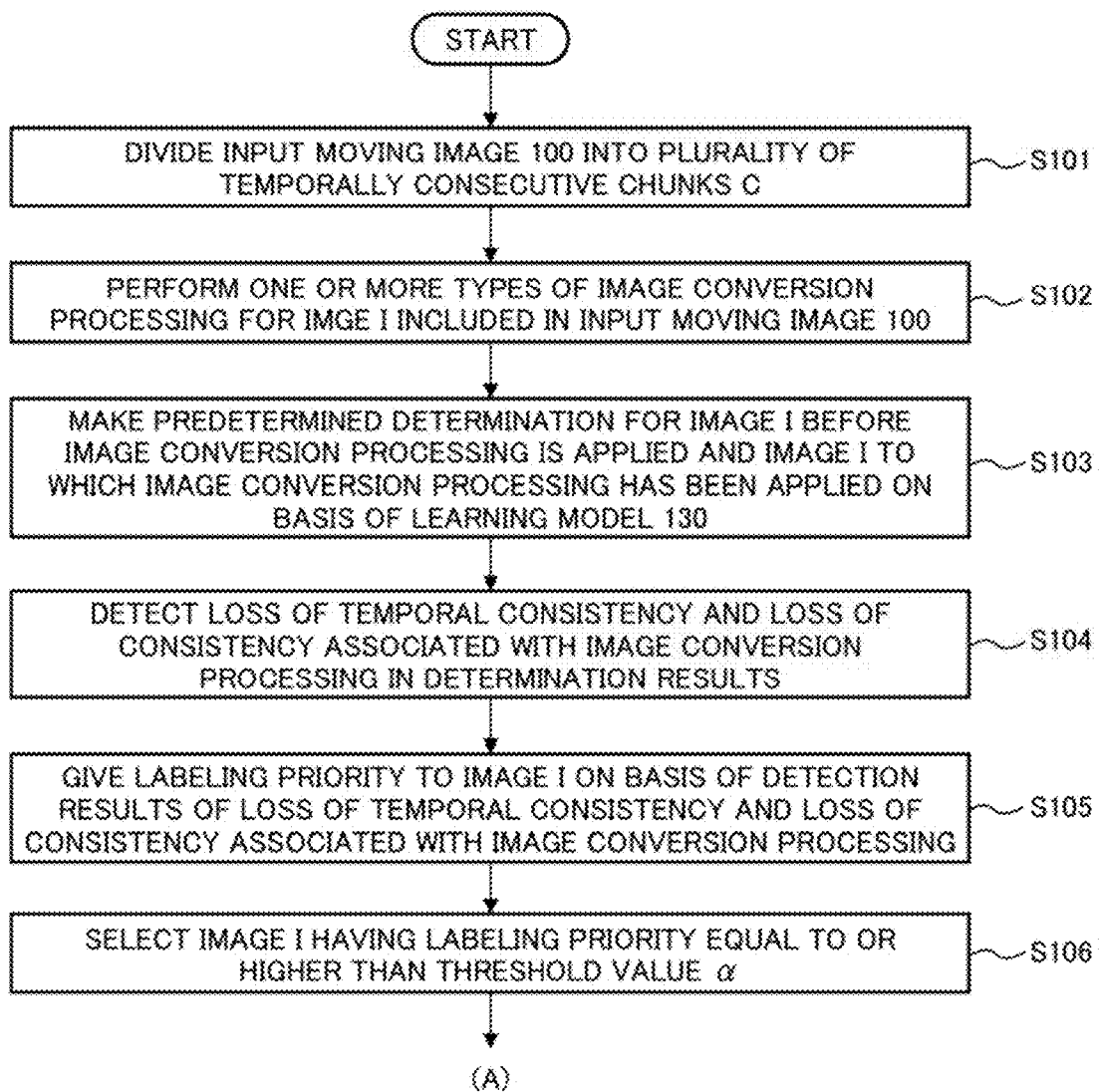

MACHINE LEARNING DEVICE, MACHINE LEARNING METHOD, AND RECORDING MEDIUM STORING MACHINE LEARNING PROGRAM

This application is a National Stage Entry of PCT/JP2019/045908 filed on Nov. 25, 2019, the contents of all of which are incorporated herein by reference, in their entirety.

TECHNICAL FIELD

The invention of the present application relates to a technology for generating training data in a system that generates a learning model to be used when making a predetermined determination for time-series data.

BACKGROUND ART

Currently, a statistical machine learning method is used in many systems that perform image recognition and the like. In this statistical machine learning, it is necessary to prepare a large amount of data (training data) to which a correct answer label (correct answer information) related to a domain to be recognized is provided and use these training data for learning and evaluation. However, there is a problem that the preparation of such training data requires an extremely high cost in terms of time, money, and labor. Therefore, expectations for a technique for efficiently obtaining such training data (efficiently providing a label to data) are increasing.

As a technique related to such a technique, PTL 1 discloses a method of modeling an unlabeled or partially labeled target data set using a machine learning model for classification or regression. In this method, the target data set is processed by the machine learning model. In this method, a subgroup of the target data sets is created for presentation to a user for labeling or label verification. In the method, label verification, user relabeling, or user labeling of the subgroup is received. Then, in this method, the updated target data set is reprocessed by the machine learning model.

Further, PTL 2 discloses an image recognition system including a plurality of types of dictionaries constructed in advance for each situation by learning a feature of an object on the basis of a plurality of image examples of the object prepared for the each situation. This system selects a dictionary according to a place and a time zone when an image is obtained by an imaging device, and sequentially collates an extracted image extracted from the image obtained by the imaging device with a plurality of types of patterns in the selected dictionary, thereby determining whether the object is a target object.

In addition, PTL 3 discloses a video indexing device in which a definition label representing image content is defined in advance, and when a scene corresponding to the definition label appears in a video to be indexed, the definition label is provided to the scene. The device stores a first class identification function and a second class identification function as dictionary data. The first class identification function determines whether an image to be processed is an image representing the definition label calculated by the definition label and a feature amount extracted from a correct positive case image representing the definition label provided as an image for learning. The second class identification function identifies a positive case image and a negative case image calculated by a feature amount extracted from the correct positive case image representing the definition label provided as the image for learning and an incorrect negative case image. When a video to be indexed is given, the device determines whether a frame image selected from the video is an image representing the definition label by using the first class identification function, and obtains a frame image that is a candidate to be labeled with the definition label. The device excludes the image corresponding to the negative case image from the candidate frame image uses the second class identification function to determine whether the candidate frame image corresponds to the positive case image or the negative case image, thereby, and giving the definition label to the image to which the definition label corresponding to the positive case image is to be given.

CITATION LIST

Patent Literature

[PTL 1] JP 2018-537798 A
[PTL 2] JP 2011-059810 A
[PTL 3] JP 2009-181306 A

SUMMARY OF INVENTION

Technical Problem

For example, in a system that identifies a target object from time-series data such as a monitoring video, statistical machine learning is performed using positive data (an image including an object to be detected) and negative data (an image not including an object to be detected). In this case, the positive data is classified into, for example, "vehicle", "pedestrian", or the like according to the type of the included object, and labeled data (training data) in which a label indicating the class is attached to the image is generated. Meanwhile, for the negative data, labeled data to which a label representing one class such as "others" or "negative" is assigned is generated.

Then, in the above-described system that identifies a target object from a monitoring video or the like, a large amount of negative data is generally included in time-series images to be used in the statistical machine learning. In such a case, most of the labeled data to be used at the time of machine learning belongs to specific one class such as "others" or "negative", and data imbalance in learning data occurs. As a result, such a system has a problem that the accuracy of the learning model representing a result of performing the machine learning is reduced.

Further, in an actual determination result, in a period in which an object is shown in the monitoring video, there is a case where detection of the object succeeds in a certain image (frame) while detection of the object fails in another image ("positive" is erroneously determined as "negative"). Alternatively, conversely, in an image that does not actually include the object, the object may be erroneously detected ("negative" may be erroneously determined as "positive").

Such an erroneous determination is considered to be a phenomenon caused by the fact that determination capability of the current determination means cannot cope with variations in the image due to movement of the object, posture of the object, a background variation, a variation in a light source or noise, and the like. An image in which such an erroneous determination has occurred is considered to be suitable as training data for enhancing the accuracy of the learning model, but in general, the ratio of the image in which such an erroneous determination has occurred to the entire monitoring video (that is, occupied as training data) is very small compared to, for example, the ratio of an image or the like when the video is correctly determined to be "negative". Therefore, there is a problem that it is difficult to reflect the result of performing the machine learning in the learning model so as to avoid such an erroneous determination, and it is difficult to efficiently perform the statistical machine learning.

That is, in a case of performing the machine learning on the basis of time-series data, solving the above-described problem and efficiently improve the accuracy of the machine learning is a problem. The above-described techniques disclosed in PTLs 1 to 3 cannot be said to be sufficient to solve this problem.

A main object of the invention of the present application is to efficiently improve the accuracy of a learning model in a case of performing machine learning on the basis of time-series data.

Solution to Problem

A machine learning device according to one aspect of the invention of the present application includes: a detection means configured to detect a loss of consistency with passage of time in a determination result for unit data, the determination result having been output from a determination means that has generated a learning model to be used when making a predetermined determination for one or more pieces of the unit data that constitute time-series data; and a selection means configured to select, based on a detection result by the detection means, the unit data to be used as training data when the determination means updates the learning model.

In another viewpoint of achieving the above object, in a machine learning method according to one aspect of the invention of the present application, an information processing device detects a loss of consistency with passage of time in a determination result for unit data, the determination result having been output from a determination means that has generated a learning model to be used when making a predetermined determination for one or more pieces of the unit data that constitute time-series data; and selects, based on a detection result of the loss of consistency, the unit data to be used as training data when the determination means updates the learning model.

Furthermore, in a further viewpoint of achieving the above object, a machine learning program according to one aspect of the invention of the present application causes a computer to execute: detection processing of detecting a loss of consistency with passage of time in a determination result for unit data, the determination result having been output from a determination means that has generated a learning model to be used when making a predetermined determination for one or more pieces of the unit data that constitute time-series data; and selection processing of selecting, based on a detection result of the detection processing, the unit data to be used as training data when the determination means updates the learning model.

Moreover, the invention of the present application can also be implemented by a computer-readable non-volatile recording medium storing the machine learning program (computer program).

Advantageous Effects of Invention

The invention of the present application enables efficient improvement of the accuracy of a learning model in a case of performing machine learning on the basis of time-series data.

BRIEF DESCRIPTION OF DRAWINGS

FIG. 8A is a flowchart (1/2) illustrating an operation of the machine learning device 10 according to the first example embodiment of the invention of the present application.

EXAMPLE EMBODIMENT

The disclosure having the example embodiments to be described below as examples has been obtained from an idea that it is possible to generate training data that can efficiently improve the accuracy of a learning model by detecting a loss of consistency (temporal consistency) with passage of time in a determination (identification) result output from a determination means (also referred to as a discriminator) that has generated the learning model to be used when making a predetermined determination (also referred to as identification) for time-series data.

That is, in a case of making a predetermined determination for time-series data, it is generally estimated that a correct determination result maintains temporal consistency. For example, in a case of detecting an object such as a pedestrian or a vehicle from a monitoring video, it is expected to continuously detect the object while the object is shown in the monitoring video. However, as described above, when an event that cannot be handled by a determination capability of the determination means accidentally occurs in data to be determined, an erroneous determination occurs, and the loss of temporal consistency occurs in the determination result.

Therefore, by selecting data to be used as training data on the basis of the detection result of the loss of temporal consistency, a small number of erroneous determination data suitable for machine learning can be preferentially included in the training data. Then, at the same time, by generating the training data in this way, it is possible to reduce a ratio of data of when continuously correctly determining "negative" (with temporal consistency), which originally occupies a majority in the training data, for example.

Since the training data generated in this manner preferentially includes data suitable for resolving imbalance of learning content and improving the accuracy of the machine learning, it can be expected to efficiently improve the accuracy of the learning model.

Hereinafter, example embodiments of the invention of the present application will be described in detail with reference to the drawings.

First Example Embodiment

Figure 1:
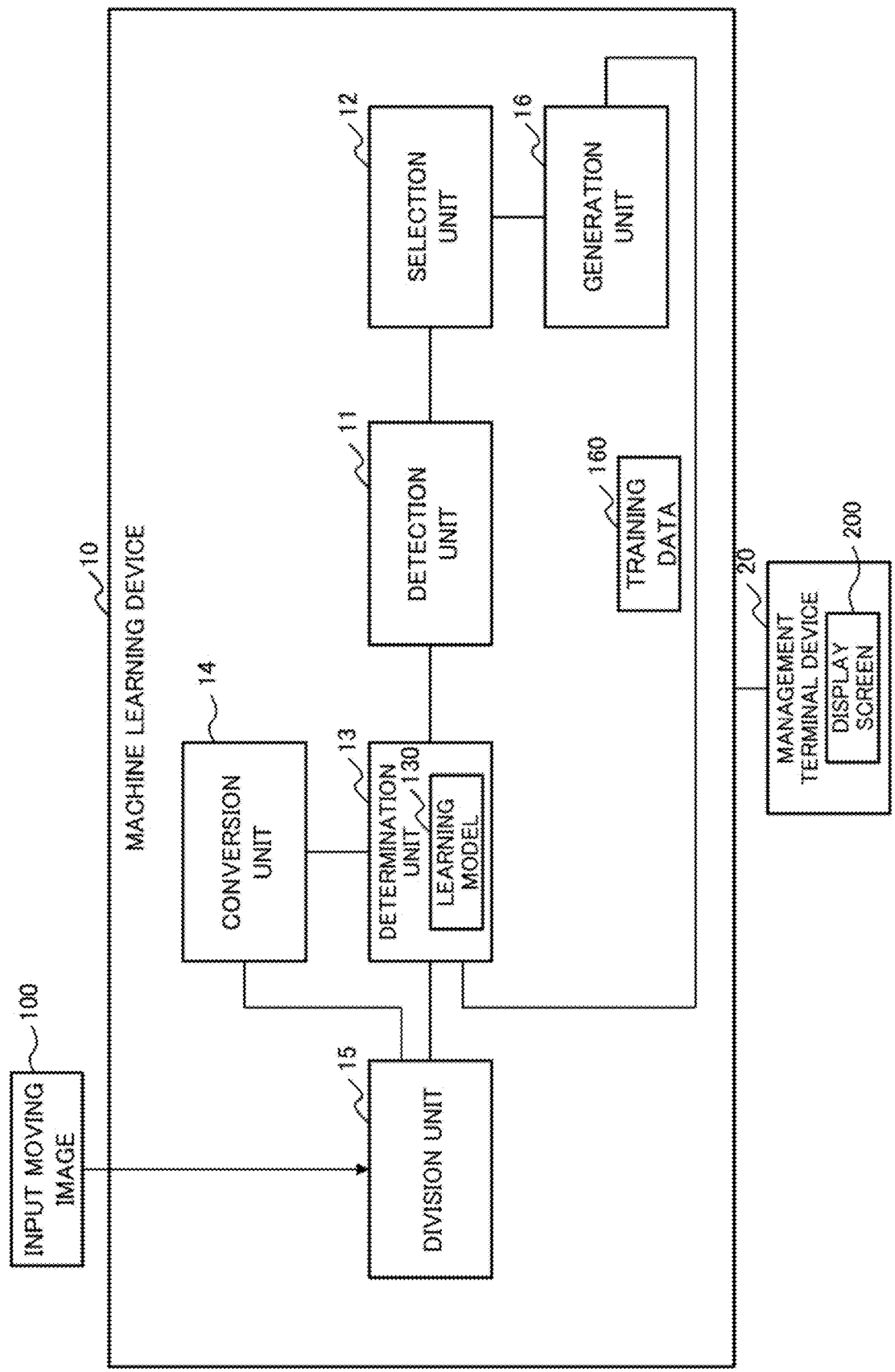
FIG. 1 is a block diagram illustrating a configuration of a machine learning device 10 according to a first example embodiment of the invention of the present application.

FIG. 1 is a block diagram illustrating a configuration of a machine learning device 10 according to a first example embodiment of the invention of the present application. The machine learning device 10 according to the present example embodiment is a device that generates a learning model to be used when, for example, determining whether a person has entered a monitoring target area on the basis of an input moving image 100 (time-series data) in which the monitoring target area is captured by a monitoring camera. Note that content of machine learning performed by the machine learning device 10 on the basis of the input moving image 100 may be, for example, detecting a target object (a pedestrian, a vehicle, or the like) from the input moving image 100.

A management terminal device 20 is communicably connected to the machine learning device 10. The management terminal device 20 is an information processing device such as a personal computer used when a user who uses the machine learning device 10 inputs information to the machine learning device 10 or confirms information output from the machine learning device 10. The management terminal device 20 may be built in the machine learning device 10.

The machine learning device 10 includes a detection unit 11, a selection unit 12, a determination unit 13, a conversion unit 14, a division unit 15, and a generation unit 16. Note that the detection unit 11, the selection unit 12, the determination unit 13, the conversion unit 14, the division unit 15, and the generation unit 16 are examples of a detection means, a selection means, a determination means, a conversion means, a division means, and a generation means in order.

The determination unit 13 determines whether a person has entered the monitoring target area on the basis of an image (frame) that is unit data constituting the input moving image 100 and a learning model 130. The determination unit 13 updates the learning model 130 to be used for this determination on the basis of training data 160. Note that the learning model 130 is assumed to be stored in a storage device (not illustrated) such as a memory or a hard disk.

Figure 2:
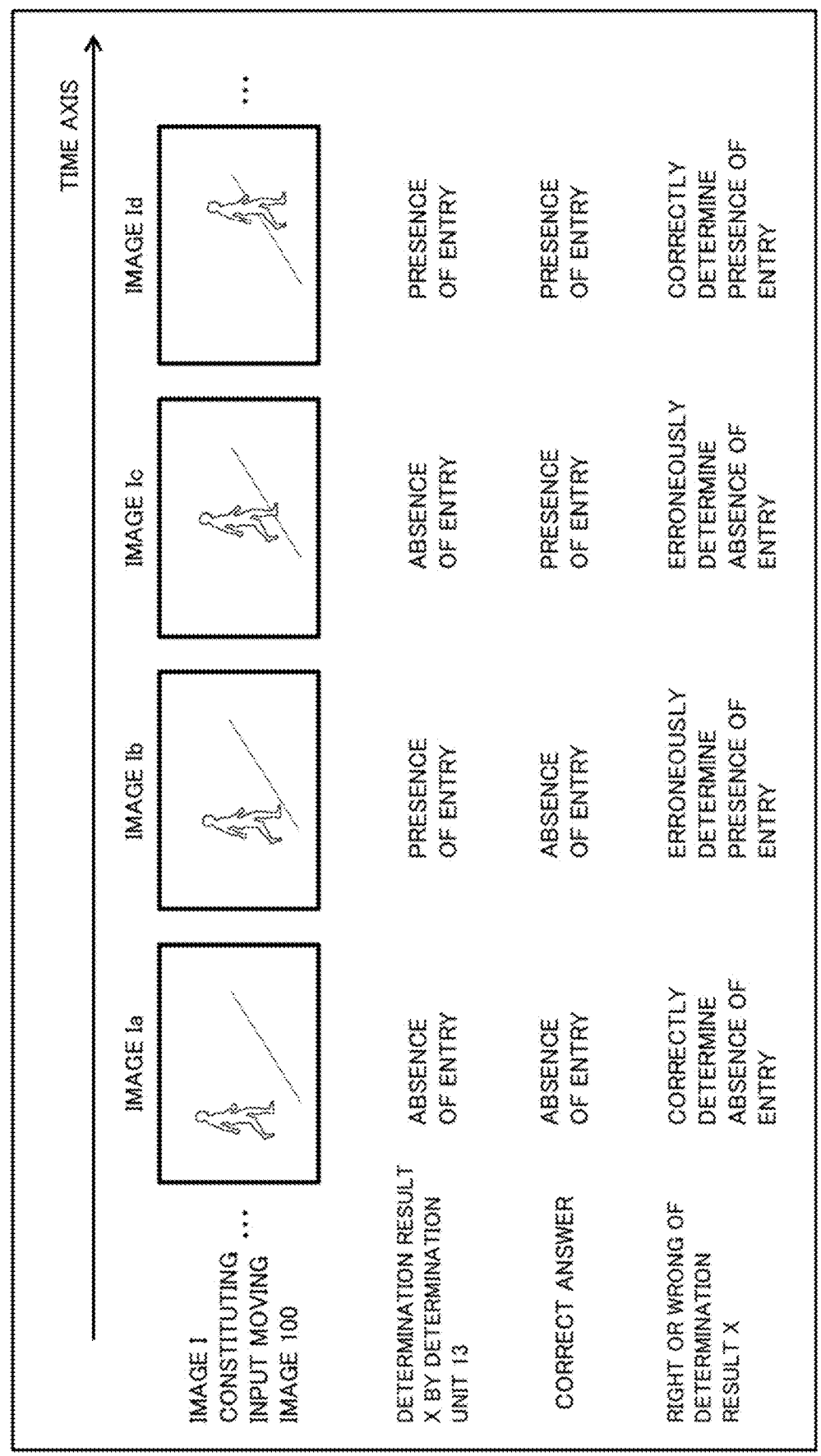
FIG. 2 is a diagram illustrating determination results by a determination unit 13 according to the first example embodiment of the invention of the present application.

FIG. 2 is a diagram illustrating determination results by the determination unit 13 according to the present example embodiment. In the example illustrated in FIG. 2, the determination unit 13 determines whether a person moving from the left side to the right side in an image I constituting the input moving image 100 has entered a region (monitoring target area) on the right side of a boundary line indicated in each image.

As illustrated in FIG. 2, the determination unit 13 correctly determines that the person has not entered the monitoring target area with respect to an image Ia. For an image Ib, the determination unit 13 erroneously determines that the person has entered the monitoring target area although the person has not entered the monitoring target area. For an image Ic, the determination unit 13 erroneously determines that the person has not entered the monitoring target area although the person has entered the monitoring target area. For an image Id, the determination unit 13 correctly determines that the person has entered the monitoring target area.

In the example illustrated in FIG. 2, the determination unit 13 has made the erroneous determinations for the image Ib and the image Ic because the current determination capability of the determination unit 13 cannot cope with the image Ib and the image Ic. Then, when the determination unit 13 makes determinations for the image Ib and the image Ic, the loss of temporal consistency in the determination results has occurred.

In a case where the machine learning device 10 determines whether a person has entered the monitoring target area, there are two types of determination results obtained by the determination unit 13: "positive" indicating that the entry has occurred; and "negative" indicating that the entry has not occurred. In this case, a determination result $X_t$ for a certain image in the input moving image 100 by the determination unit 13 can be expressed by, for example, Expression 1, using one-hot vector expression.

$$X_t = \begin{cases} [1, 0]^T & \text{(if Positive)} \\ [0, 1]^T & \text{(otherwise)} \end{cases} \quad \text{(Expression 1)}$$

Note that, in Expression 1, t represents an identifier in time series that can identify an image to be determined in the input moving image 100, and T is a code representing a transposed vector.

In a case where there are three or more types of determination results by the determination unit 13, the determination result $X_t$ can be similarly expressed by a three or more dimensional vector. Further, the determination unit 13 may make a predetermined determination for each predetermined detection window or anchor in each individual image instead of making a predetermined determination for the entire individual image to be determined.

In a case where the number of time-series images included in the input moving image 100 is N (N is an arbitrary natural number), the time-series images I are expressed as $\{I_1, I_2, \ldots, I_N\}$, and the determination results X for the respective images by the determination unit 13 are expressed as $\{X_1, X_2, \ldots, X_N\}$.

The detection unit 11 detects the loss of temporal consistency regarding the determination result X for the image I. At this time, the detection unit 11 calculates a difference (distance) between the determination result $X_t$ for the image $I_t$ to be detected and the determination result for an image adjacent to the image $I_t$, as a value representing the loss of temporal consistency.

In the detection of the loss of temporal consistency by the detection unit 11, an evaluation target period including the image $I_t$ and the adjacent image is set to, for example, $\tau_t$ given in Expression 2.

$$\tau_t = \{t-a, t+b\}(\forall t \in [a, N-1-b]) \quad \text{(Expression 2)}$$

Note that, in Expression 2, a and b are parameters defining the evaluation target period. The values of a and b may be fixed values given in advance, or may be values dynamically set according to a predetermined setting criterion.

Figure 3:
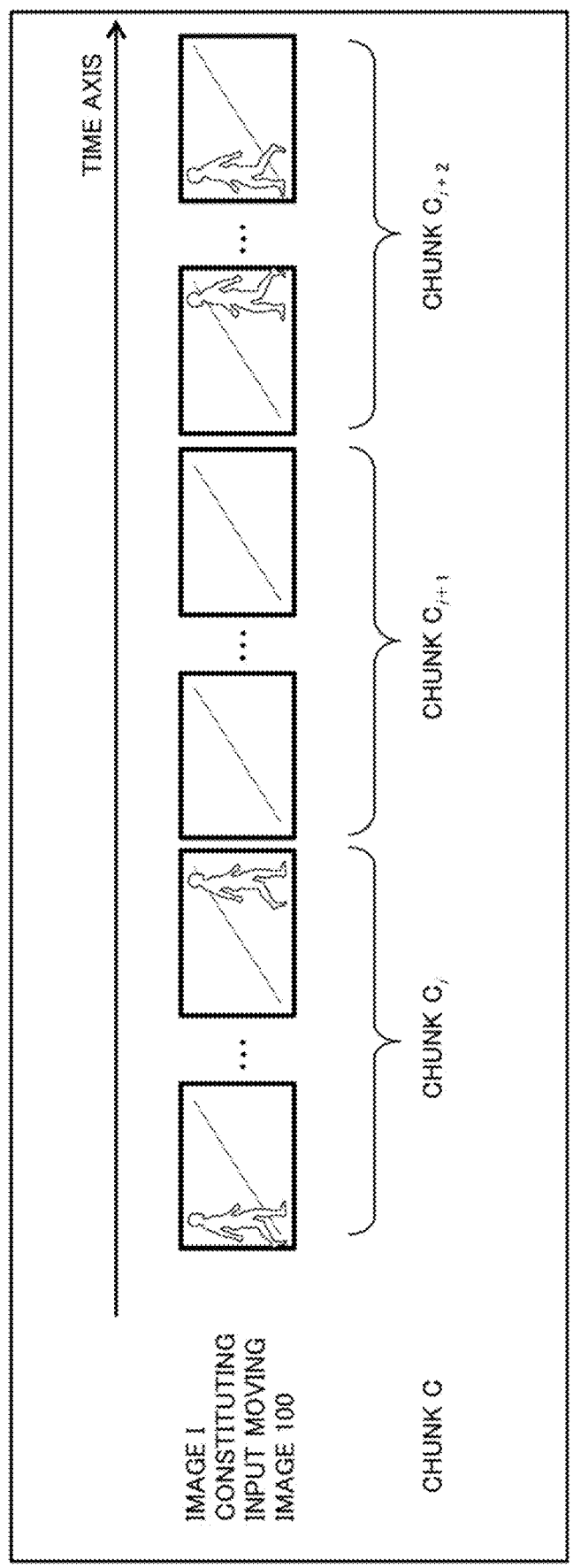
FIG. 3 is a diagram illustrating an input moving image 100 divided into a plurality of chunks by a division unit 15 according to the first example embodiment of the invention of the present application.

The division unit 15 illustrated in FIG. 1 dynamically sets the values of a and b described above. FIG. 3 is a diagram illustrating the input moving image 100 divided into a plurality of chunks C by the division unit 15 according to the present example embodiment. Here, the chunks C represent a part of the input moving image 100, which can be regarded as a moving image that is temporally continuous and represents the same event with respect to the determination by the determination unit 13.

A chunk $C_i$ (i is an arbitrary natural number) illustrated in FIG. 3 is a moving image representing an event in which a person appears from the left side in the image, proceeds to the right side in the image, enters the monitoring target area, and then disappears to the right side in the image. The chunk $C_{i+2}$ is a moving image representing an event in which the person appears from the right side in the image, proceeds to the left side in the image, exits from the monitoring target area, and then disappears to the left side in the image. The chunk $C_{i+1}$ is a moving image represents an event in which no person is present in the image, sandwiched between the chunk $C_i$ and the chunk $C_{i+2}$ on a time axis.

The division unit 15 divides the input moving image 100 into M (M is an arbitrary natural number) chunks $\{C_1, C_2, \ldots, C_M\}$ on the basis of, for example, similarity of the image I constituting the input moving image 100.

The loss of temporal consistency $TCL_t$ calculated by the detection unit 11 can be defined as illustrated in Expression 3, for example.

$$TCL_t = \mathrm{dist}(X_t, \overline{X_{\tau_t \setminus \{t\}}}) \qquad \text{(Expression 3)}$$

Note that, in Expression 3, "dist" represents a distance function normalized to [0, 1]. A subscript portion of X in the second term (second vector) in the function "dist" illustrated in Expression 3 represents a difference set obtained by removing a set {t} from the set Tt. That is, the second term represents an average value of X excluding $X_t$ (first vector) among the determination results X for the image I within the evaluation target period $\tau_t$. Further, as the distance function, various known functions can be used, and for example, a function representing cross entropy in which each of the first term and the second term in "dist" is regarded as a probability distribution may be used.

Figure 4:
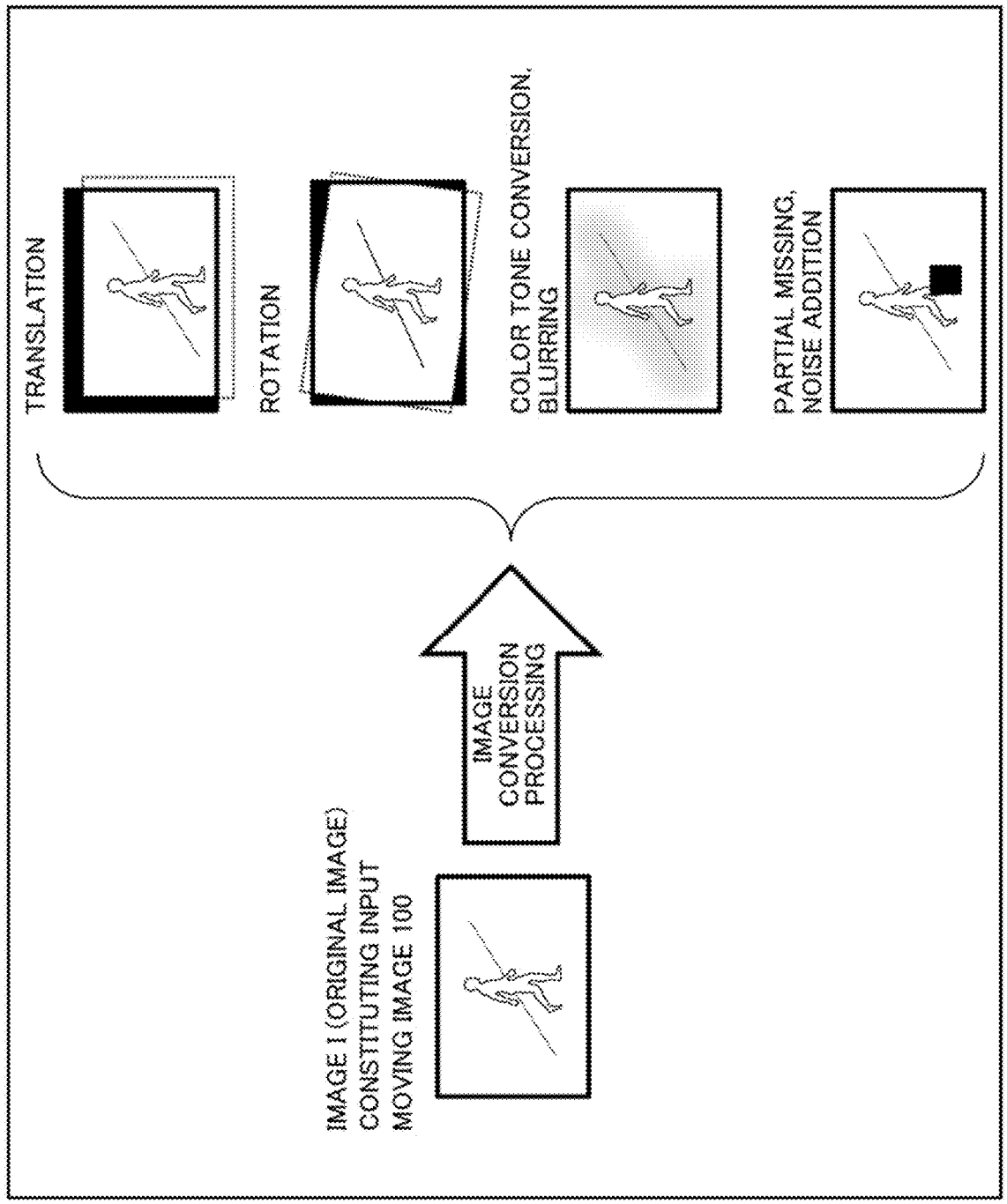
FIG. 4 is a diagram illustrating image conversion processing by a conversion unit 14 according to the first example embodiment of the invention of the present application.

The conversion unit 14 in FIG. 1 performs predetermined image conversion processing for the image I constituting input moving image 100. FIG. 4 is a diagram illustrating the image conversion processing by the conversion unit 14 according to the present example embodiment. As illustrated in FIG. 4, the conversion unit 14 performs the image conversion processing such as translation, rotation, color tone conversion, blurring, partial missing, and noise addition for the image I (original image). Note that the image conversion processing illustrated in FIG. 4 is an example, and the conversion unit 14 may apply image conversion processing different from the above-described image conversion processing to the image I.

The image conversion processing performed by the conversion unit 14 is assumed to be minute conversion processing. That is, for example, in the case of translation, it is sufficient that the movement is about several pixels, and in the case of rotation, the rotation is about several degrees.

The conversion unit 14 inputs the image I to which the image conversion processing has been applied to the determination unit 13. The determination unit 13 similarly determines whether a person has entered the monitoring target area for the image I after the image conversion processing input from the conversion unit 14.

Further, in a case where the determination content by the determination unit 13 is content that affects the determination result depending on the position of a detection target (person or the like) in the image, such as whether the person has entered the monitoring target area, for example, as described above, the conversion unit 14 may exclude the image conversion processing by which the position of the image changes before and after the conversion processing such as translation or rotation. That is, the conversion unit 14 may change the conversion processing applied to the image I according to the determination content by the determination unit 13.

In the determination result by the determination unit 13, the detection unit 11 detects the loss of consistency associated with the image conversion processing by the conversion unit 14, similarly to the above-described loss of temporal consistency. The loss of consistency $ACL_t$ associated with the image conversion processing calculated by the detection unit 11 can be defined as illustrated in Expression 4, for example.

$$ACL_t = \mathrm{mean}(\mathrm{dist}(X_t, X_t^{(i)})) \qquad \text{(Expression 4)}$$

Note that, in Expression 4, "mean" represents an average value, and the second term in "dist" represents the determination result by the determination unit 13 for the image to which the i-th (i is an arbitrary natural number) type of the image conversion processing among one or more types of the image conversion processing such as translation and rotation has been applied.

The selection unit 12 illustrated in FIG. 1 calculates a priority Y of providing a label to the image I (that is, using the image I as training data in machine learning by the determination unit 13) on the basis of the loss of temporal consistency $TCL_t$ regarding the determination result X for the image I detected by the detection unit 11. The priority Y is expressed as $\{Y_1, Y_2, \ldots, Y_N\}$ using the number N of the time-series images.

The selection unit 12 may calculate the priority $Y_t$ on the basis of the loss of temporal consistency $TCL_t$ described above, or may calculate the priority $Y_t$ on the basis of both the loss of temporal consistency $TCL_t$ and the loss of consistency $ACL_t$ associated with the image conversion processing. In the case of calculating the priority $Y_t$ on the basis of both the loss of temporal consistency $TCL_t$ and the loss of consistency $ACL_t$ associated with the image conversion processing, the selection unit 12 calculates the priority $Y_t$, using Expression 5, for example.

$$Y_t = (1-\delta)*TCL_t + \delta*ACL_t \qquad \text{(Expression 5)}$$

Note that, in Expression 5, $\delta$ is a coefficient indicating weighting having any value between 0 and 1.

The selection unit 12 selects the image $I_t$ to be labeled (used as training data in machine learning by the determination unit 13) on the basis of a predetermined selection criterion and the priority $Y_t$ regarding the image $I_t$. A selection result Z by the selection unit 12 is expressed as $\{Z_1, Z_2, \ldots, Z_N\}$, using the number N of the time-series images. Note that the value of the selection result $Z_t$ is "1" indicating that a label is given (used as the training data) or "0" indicating that no label is given (not used as the training data).

The first example of the selection criterion used when the selection unit 12 selects the image $I_t$ to be labeled is that the priority $Y_t$ is equal to or greater than a threshold value $\alpha$. In this case, the selection unit 12 obtains, for example, a set $S_\alpha$ of identifiers t indicating the image $I_t$ satisfies Expression 6.

$$S_\alpha = \{t | Y_t \geq \alpha\} \quad \text{(Expression 6)}$$

The second example of the selection criterion used when the selection unit 12 selects the image $I_t$ to be labeled is to select the image $I_t$ in order of the priority $Y_t$ from the image $I_t$ having the highest priority $Y_t$ such that the ratio of the image $I_t$ to be selected with respect to all the images $I_t$ becomes equal to or less than a predetermined value β. In this case, the selection unit 12 obtains, for example, a set $S_\beta$ of identifiers t indicating the image $I_t$ satisfies Expression 7.

$$S_\beta = \{t | Y_t \in Y_{\beta+}, \min(Y_{\beta+}) \geq \max(Y_{\beta-}), Y = \{Y_{\beta+}, Y_{\beta-}\}, \#Y_{\beta+}/\#Y \leq \beta\} \quad \text{(Expression 7)}$$

Note that, in Expression 7, $Y_{\beta+}$ and $Y_{\beta-}$ respectively represent a set of priorities having values included in the high-order ratio 13 in the set Y and a set of other priorities, and min $(Y_{\beta+})$ and max $(Y_{\beta-})$ respectively represent the lowest value of the priorities included in the set $Y_{\beta+}$ and the highest value of the priorities included in the set Y. In Expression 7, $\#Y_{\beta+}$ and $\#Y$ represent the number of elements of the set $Y_{\beta+}$ and the set Y, respectively.

A third example of the selection criterion used when the selection unit 12 selects the image $I_t$ to be labeled is to select the image $I_t$ in order of the priority $Y_t$ from the image $I_t$ having the highest priority $Y_t$ such that the number of the images $I_t$ to be selected becomes equal to or less than a predetermined value γ. In a case of performing the selection operation of the image $I_t$ based on the selection criterion of the third example for each of the above-described M divided chunks C, the selection unit 12 obtains, for example, a set $S_\gamma$ of identifiers t indicating the image $I_t$ satisfies Expression 8.

$$S_\gamma = \{t | \cap_{j \in [1,M]} \{C_{j+} | C_j = \{C_{j+}, C_{j-}\}, \min(Y_{t \in C_{j+}}) \geq \max(Y_{t \in C_{j-}}), \#C_{j+} \leq \gamma\}\} \quad \text{(Expression 8)}$$

Note that, in Expression 8, $C_{j+}$ and $C_{j-}$ respectively represent a set of priorities of which the heights of the priorities are included in up to the γth in the chunk $C_j$ (j is an integer of 1 to M) and a set of other priorities included in the chunk $C_j$. Further, in Expression 8, $\#C_{j+}$ represents the number of elements of the set $C_{j+}$.

When selecting the image $I_t$ to be labeled, the selection unit 12 may use a combination of the above-described plurality of selection criteria. Further, the selection unit 12 may perform the above-described operation of selecting the image $I_t$ to be labeled in the input moving image 100 before being divided into the chunks C, or may perform the operation by applying at least one of the above-described selection criteria for each chunk C. At that time, the selection unit 12 may use α, β, and γ in which the values are individually set for each chunk C.

The generation unit 16 illustrated in FIG. 1 presents the image I to which the label (correct answer information) is to be given (selection image to be labeled) selected by the selection unit 12 to the user by displaying the image I on a display screen 200 of the management terminal device 20, for example. Then, the generation unit 16 generates the training data 160 by giving the label input by the input operation to the management terminal device 20 by the user to the selection image to be labeled.

Figure 5:
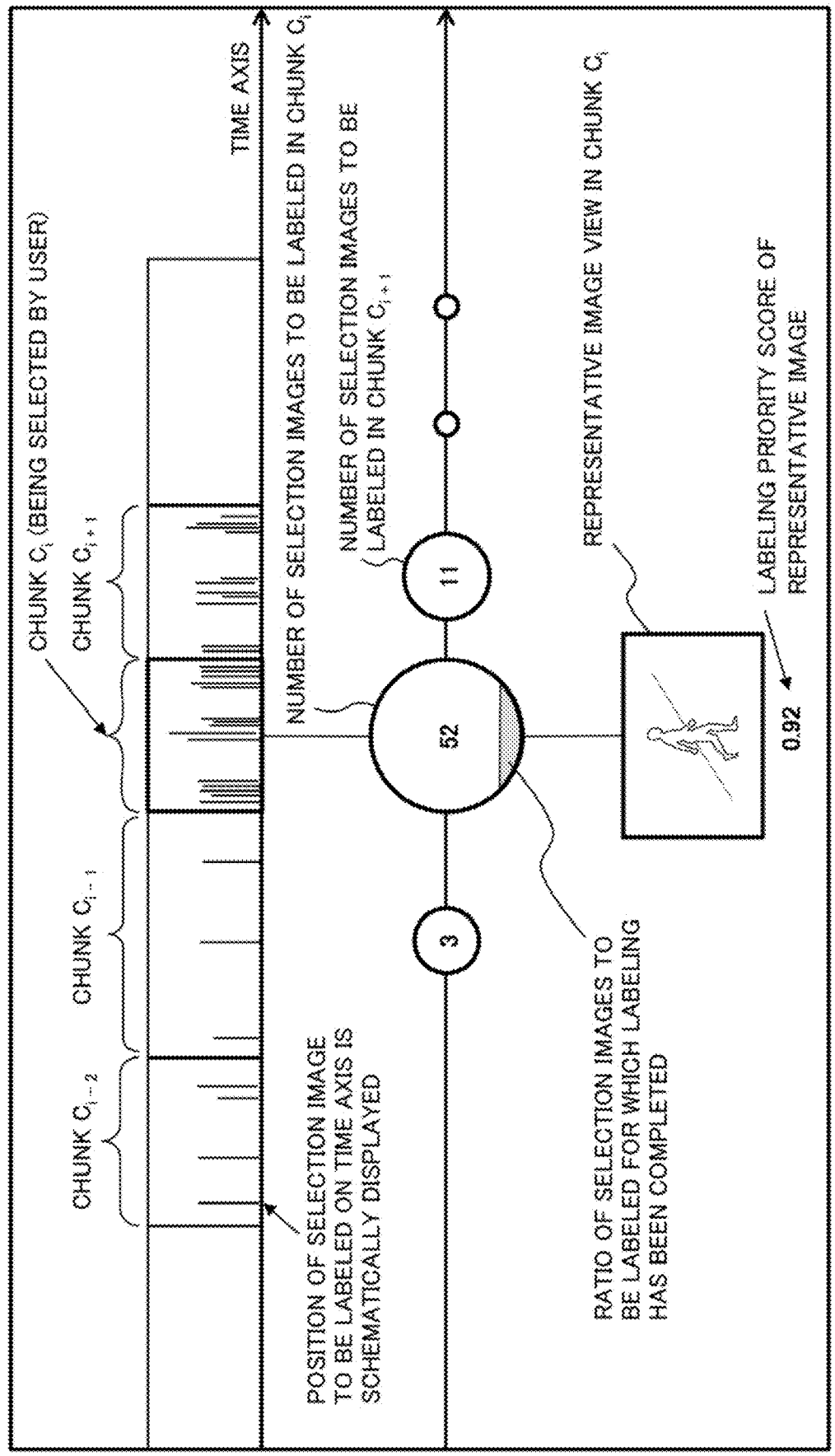
FIG. 5 is a diagram illustrating content of a first screen to be displayed on a display screen 200 when a generation unit 16 according to the first example embodiment of the invention of the present application accepts an input operation of a label by a user.

FIG. 5 is a diagram illustrating content of a first screen to be displayed on the display screen 200 when the generation unit 16 according to the present example embodiment accepts the input operation of the label by the user. As illustrated in FIG. 5, the generation unit 16 schematically displays, for each chunk C, the position of the selection image to be labeled on the time axis by, for example, a vertical line. Note that the length (height) of the vertical line represents the height of the priority Y of the selection image to be labeled.

The generation unit 16 may display the chunks C in different colors on the first screen illustrated in FIG. 5. On the display screen 200, for example, the user can select the chunk C by moving a mouse cursor to a display location of the chunk C for which the user wants to perform a label input operation and then clicking the mouse. The generation unit 16 highlights, with a thick frame, the chunk C (chunk $C_i$ in FIG. 5) selected by the user, for example.

The generation unit 16 displays the total number of selection images to be labeled included in each chunk C. In the example illustrated in FIG. 5, the total number of selection images to be labeled included in the chunk $C_i$ is 52. At that time, as illustrated in FIG. 5, the generation unit 16 may display the total number in a circle having a size corresponding to the total number of selection images to be labeled so that the user can visually recognize the total number of selection images to be labeled.

Figure 6:
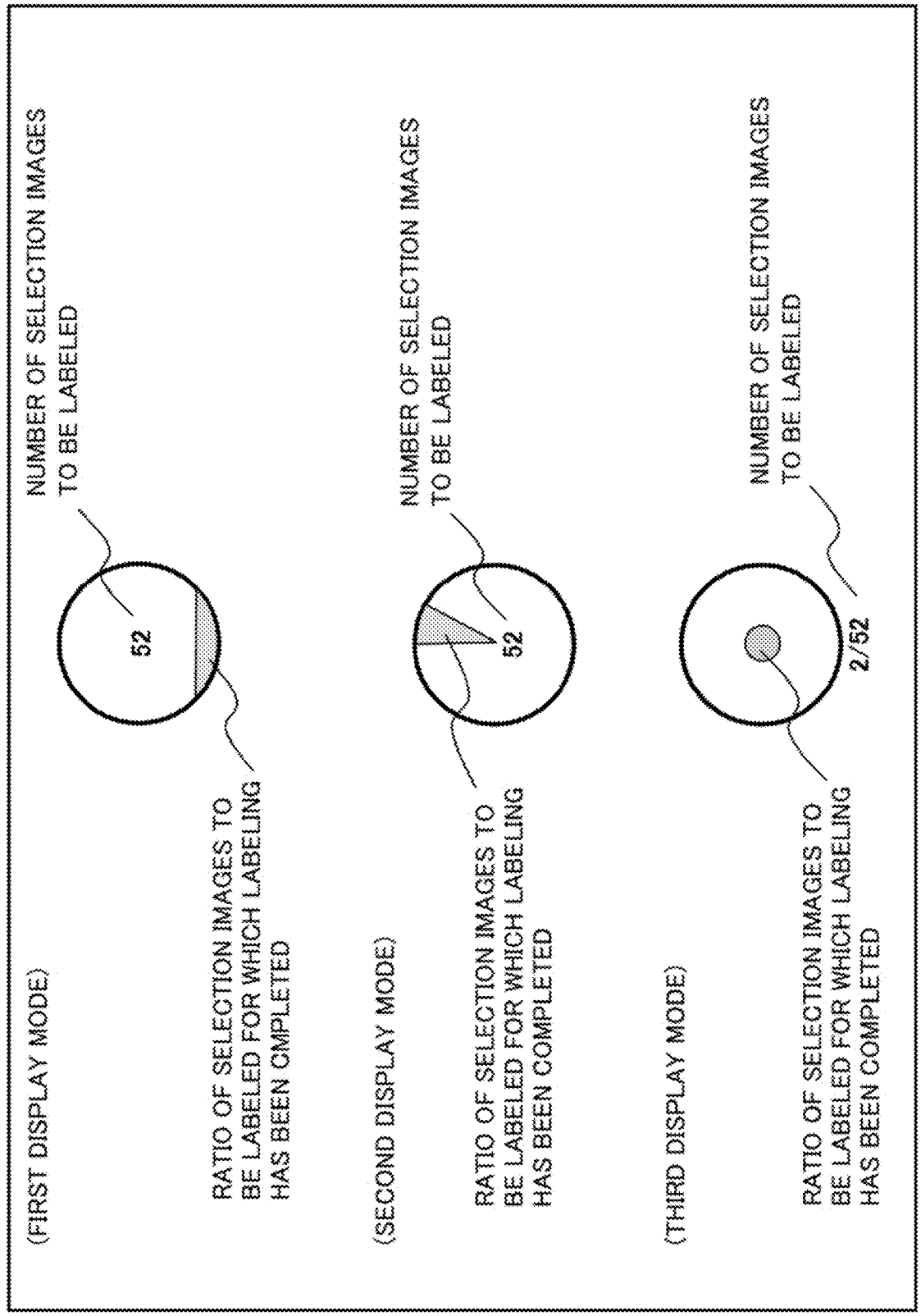
FIG. 6 is a diagram illustrating variations of display modes of a ratio of selection images to be labeled for which labeling has been completed on the first screen illustrated in FIG. 5.

In each chunk C, the generation unit 16 displays the ratio of the selection images to be labeled for which labeling has been completed with respect to the total number of selection images to be labeled so that the user can visually recognize the ratio. FIG. 6 is a diagram illustrating variations of display modes of the ratio of the selection images to be labeled for which labeling has been completed on the first screen illustrated in FIG. 5.

For example, as in the first display mode illustrated in FIG. 6, the generation unit 16 may display the ratio of the selection images to be labeled for which labeling has been completed by the size of a region extending from a bottom of the circle that displays the total number of selection images to be labeled. Further, for example, as in the second display mode illustrated in FIG. 6, the generation unit 16 may display the ratio of the selection images to be labeled for which labeling has been completed by an angle of a central angle of a fan-shaped region included in the circle that displays the total number of selection images to be labeled. Further, for example, as in the third display mode illustrated in FIG. 6, the generation unit 16 may display the ratio of the selection images to be labeled for which labeling has been completed by the size of a concentric circle of the circle that displays the total number of selection images to be labeled.

As illustrated in FIG. 5, the generation unit 16 also displays, on display screen 200, the content (view) of a representative image representing the selection images to be labeled in the chunk C selected by the user and the value (score) of the priority Y of the representative image. The representative image is, for example, the image having the highest priority Y among the selection images to be labeled included in the chunk C.

Figure 7:
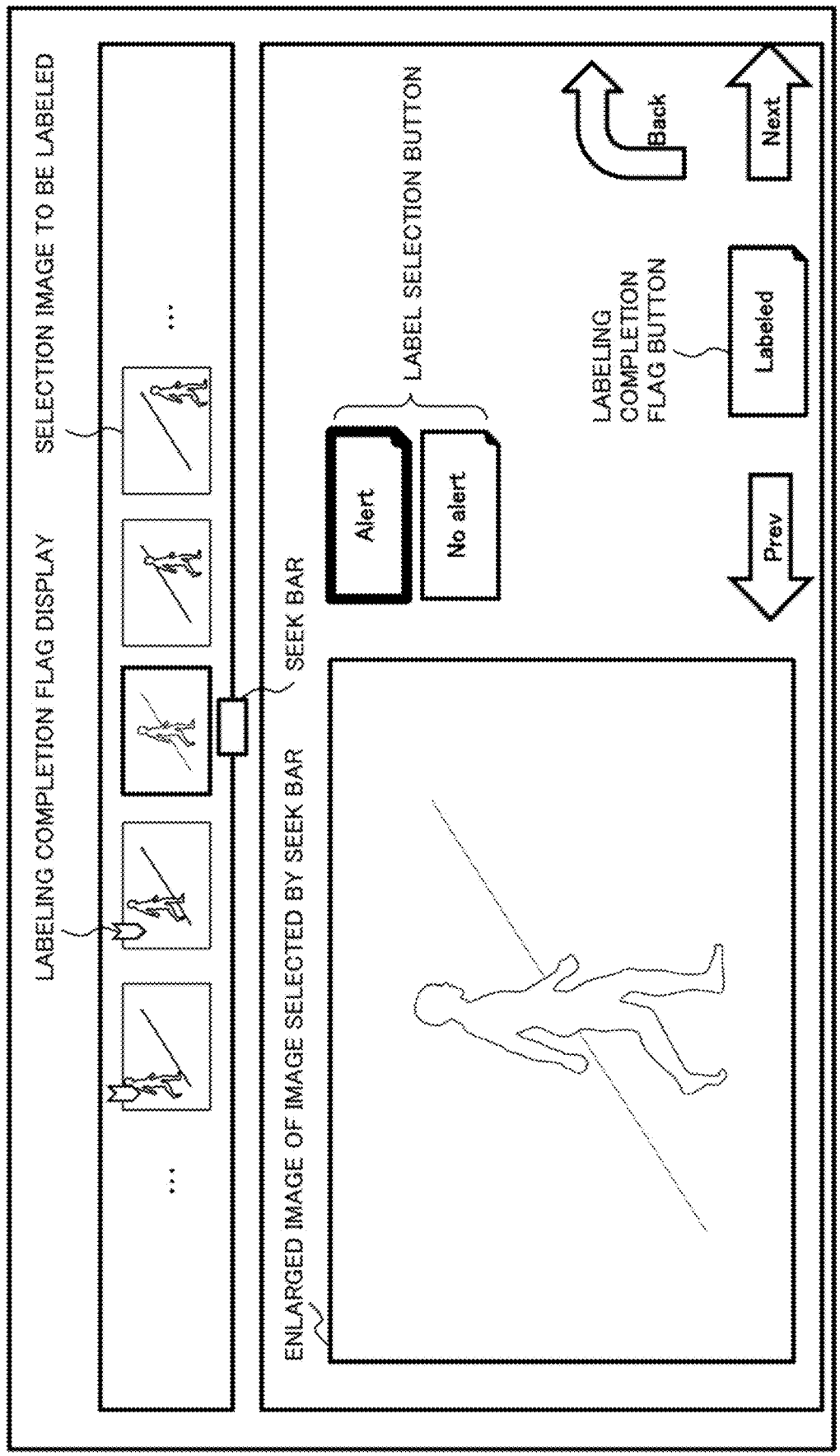
FIG. 7 is a diagram illustrating content of a second screen to be displayed on the display screen 200 when the generation unit 16 according to the first example embodiment of the invention of the present application accepts an input operation of correct answer information by the user.

FIG. 7 is a diagram illustrating content of a second screen to be displayed on the display screen 200 when the generation unit 16 according to the present example embodiment accepts the input operation of the label by the user. In the case where the user moves the mouse cursor to the display region of a certain chunk C on the first screen illustrated in FIG. 5 and then double-clicks the mouse or selects and inputs an item in a pull-down menu displayed by right clicking, the generation unit 16 switches the screen to be displayed on the display screen 200 from the first screen to the second screen.

As illustrated in FIG. 7, the generation unit 16 displays thumbnail images of the selection images to be labeled included in the chunk C selected by the user in chronological order. Alternatively, the generation unit 16 may display the thumbnail images, for example, in order of priority Y or in order of classification of completion/non-completion of labeling. The generation unit 16 may also display, in the thumbnail image, a labeling completion flag indicating that labeling by the user is completed. The user can slide the thumbnail image by moving a seek bar displayed on the second screen to the left and right, and then select the selection image to be labeled to which the label is to be given.

The generation unit 16 displays, on the display screen 200, an enlarged image of the selection image to be labeled selected by the user and a label selection button regarding the selection image to be labeled. Since the determination unit 13 according to the present example embodiment determines whether a person has entered the monitoring target area, the label selection buttons are alternative buttons of "Alert" (a person has entered the monitoring target area) and "No alert" (a person has not entered the monitoring target area). The label selection buttons may be buttons having three or more options depending on the determination content by the determination unit 13.

The generation unit 16 highlights the button selected by the user as the label to be given to the selection image to be labeled from "Alert" and "No alert". Note that the determination result by the determination unit 13 is given as an initial value (default value) of a label to the selection image to be labeled to which labeling has not been performed by the user. The generation unit 16 provides the label indicated by the label selection button to the selection image to be labeled by the user selecting one of the options of the label selection buttons and then clicking the labeling completion flag button. At the same time, the generation unit 16 highlights the labeling completion flag button. In addition, when the user selects one of the options of the label selection buttons, the generation unit 16 may provide the label to the selection image to be labeled and highlight the labeling completion flag button without waiting for the user to click the labeling completion flag button.

In a case where the user clicks a "Prev" button on the second screen illustrated in FIG. 7, the generation unit 16 displays, on the display screen 200, the second screen regarding the selection image to be labeled located immediately before the currently displayed selection image to be labeled. In a case where the user clicks a "Next" button, the generation unit 16 displays, on the display screen 200, the second screen regarding the selection image to be labeled located immediately after the currently displayed selection image to be labeled. In a case where a "Back" button is clicked, the generation unit 16 displays the first screen illustrated in FIG. 5 on the display screen 200.

The generation unit 16 generates the training data 160 representing the selection image to be labeled by the user as described above, and inputs the training data 160 to the determination unit 13. The determination unit 13 performs machine learning using the training data 160 input from the generation unit 16 and updates the learning model 130.

Figure 8B:
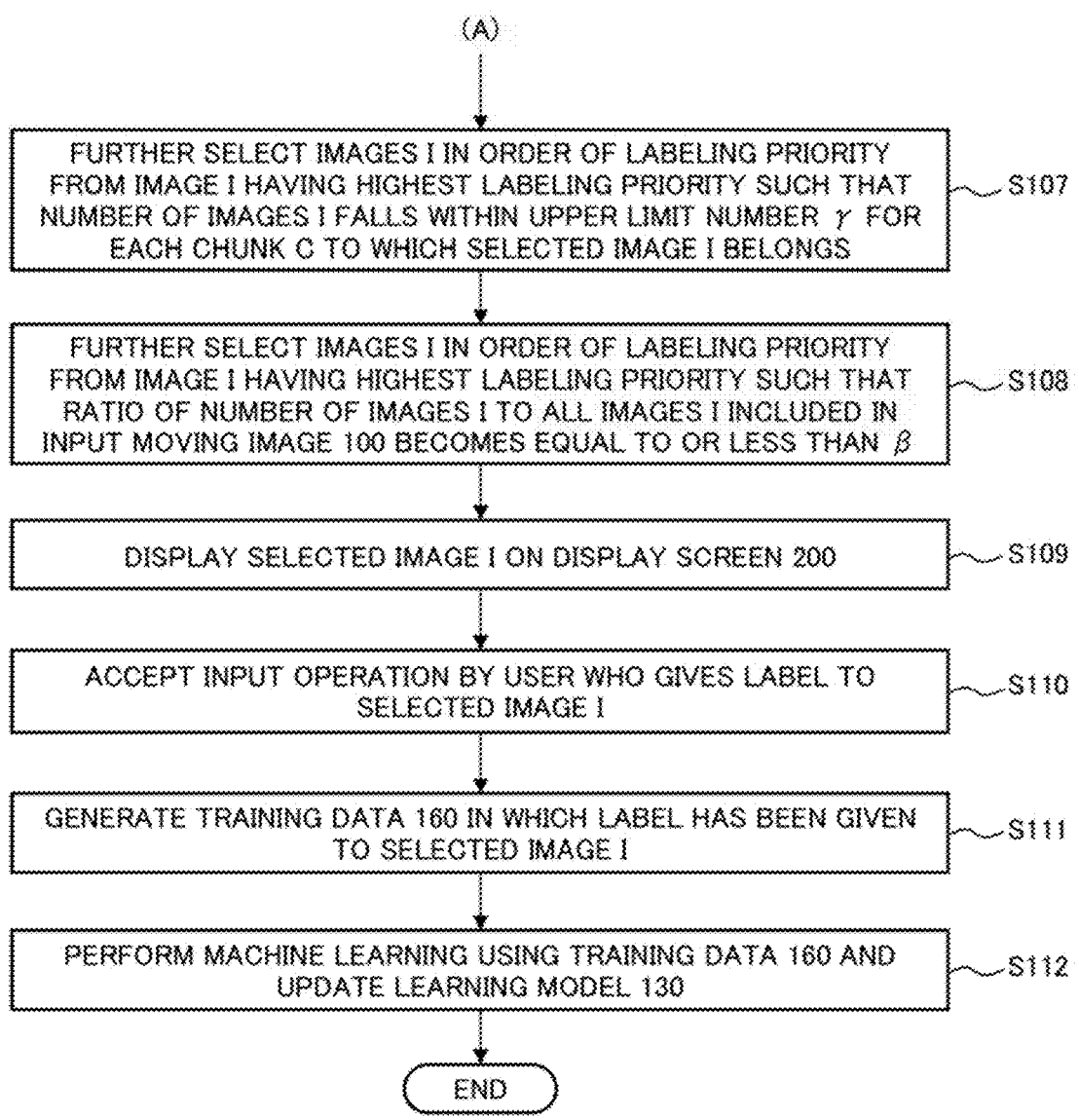
FIG. 8B is a flowchart (2/2) illustrating the operation of the machine learning device 10 according to the first example embodiment of the invention of the present application.

Next, the operation (processing) of the machine learning device 10 according to the present example embodiment will be described in detail with reference to the flowcharts of FIGS. 8A and 8B.

The division unit 15 divides the input moving image 100 into a plurality of temporally consecutive chunks C (step S101). The conversion unit 14 performs one or more types of the image conversion processing for the image I included in the input moving image 100, and inputs the image I to which the image conversion processing has been applied to the determination unit 13 (step S102).

The determination unit 13 makes a predetermined determination for the image I before the image conversion processing is applied and the image I to which the image conversion processing has been applied on the basis of the learning model 130 (step S103). In the determination result by the determination unit 13, the detection unit 11 detects the loss of temporal consistency and the loss of consistency associated with the image conversion processing (step S104).

The selection unit 12 gives a labeling priority to the image I on the basis of the detection results of the loss of temporal consistency and the loss of consistency associated with the image conversion processing by the detection unit 11 (step S105). The selection unit 12 selects the image I having the labeling priority equal to or higher than the threshold value α (step S106).

The selection unit 12 further selects the images I in order of the labeling priority from the image I having the highest labeling priority such that the number of the images I falls within the upper limit number γ for each chunk C to which the selected image I belongs (step S107). The selection unit 12 further selects the images I in order of the labeling priority from the image I having the highest labeling priority such that the ratio of the number of the images I to all the images I included in the input moving image 100 becomes β (step S108).

The generation unit 16 displays the image I selected by the selection unit 12 on the display screen 200 of the management terminal device 20 (step S109). The generation unit 16 accepts the input operation by the user who gives the label to the image I selected by the selection unit 12 (step S110).

The generation unit 16 generates the training data 160 in which the image I selected by the selection unit 12 is labeled (step S111). The determination unit 13 performs the machine learning using the training data 160 generated by the generation unit 16, updates the learning model 130 (step S112), and terminates the entire processing.

The machine learning device 10 according to the present example embodiment can efficiently improve the accuracy of the learning model in the case of performing machine learning on the basis of time-series data. The reason is that the machine learning device 10 detects the loss of temporal consistency in the determination result output from the determination unit 13 that has generated the learning model 130 to be used when making a predetermined determination for the time-series images I, and selects the image I to be used as the training data 160 when the determination unit 13 updates the learning model 130 on the basis of the detection result.

Hereinafter, effects achieved by the machine learning device 10 according to the present example embodiment will be described in detail.

In a system that identifies a target object from time-series data such as a monitoring video, statistical machine learning is performed using positive data and negative data. Time-series images used in the statistical machine learning often include a large amount of negative data. In such a case, most of labeled data used at the time of machine learning belongs to one specific class, and imbalance occurs in learning data, and as a result, there is a problem that the accuracy of a learning model representing a result of the machine learning is reduced.

In addition, in an actual determination result, an erroneous determination occurs when an event that cannot be handled by a determination capability of a determination means accidentally occurs in data to be determined. Data when such an erroneous determination occurs is considered to be suitable as training data, but in general, the ratio of the data when such an erroneous determination occurs as the training data is very small. Therefore, there is a problem that it is difficult to reflect the result of performing the machine learning in the learning model so as to avoid such an erroneous determination, and it is difficult to efficiently perform the statistical machine learning.

To solve such a problem, the machine learning device 10 according to the present example embodiment includes the detection unit 11 and the selection unit 12, and operates as described above with reference to, for example, FIGS. 1 to 8B. That is, the detection unit 11 detects the loss of consistency with passage of time in the determination result for the image I output from the determination unit 13 that has generated the learning model 130 to be used when making a predetermined determination for one or more images I (unit data) constituting the input moving image 100 (time-series data). Then, the selection unit 12 selects the image I to be used as the training data 160 when the determination unit 13 updates the learning model 130 on the basis of the detection result by the detection unit 11.

That is, since the machine learning device 10 according to the present example embodiment selects the image I to be used as the training data 160 on the basis of the detection result of the loss of temporal consistency in the determination result for the image I, the machine learning device 10 implements generation of the training data 160 that preferentially includes data suitable for resolving the imbalance of the learning content and improving the accuracy of the machine learning. Thereby, the machine learning device 10 can efficiently improve the accuracy of the learning model in the case of performing machine learning on the basis of time-series data.

Further, the machine learning device 10 according to the present example embodiment further includes the conversion unit 14 that performs predetermined conversion processing for the image I and inputs the converted image I to the determination unit 13. Then, in the determination result of the image I by the determination unit 13, the detection unit 11 detects the loss of consistency associated with the conversion processing. In a case where some minute conversion processing (translation, rotation, color tone conversion, and the like) is performed for a certain image I and a determination is made for the image I to which the conversion processing has been applied, it is normally expected that consistency of the determination result is maintained. However, for example, in the determination for the image I to which certain specific conversion processing has been applied, there is a case where consistency of the determination result associated with the conversion processing is lost due to occurrence of an erroneous determination. It is considered that this erroneous determination is caused by accidental occurrence of an event that cannot be handled by the determination capability of the determination unit 13 in the data to be determined due to the conversion processing, similarly to the case of the loss of temporal consistency. The machine learning device 10 detects the loss of consistency associated with the conversion processing in addition to the loss of temporal consistency in the determination result for the image I, and selects the image I to be used as the training data 160 on the basis of the detection result, thereby further improving the accuracy of the learning model.

Further, the machine learning device 10 according to the present example embodiment further includes the division unit 15 that divides the input moving image 100 into a plurality of temporally consecutive chunks C on the basis of, for example, an occurrence status of an event related to the determination content by the predetermined unit 13. Then, the detection unit 11 and the selection unit 12 perform the above-described operation for each chunk C. At this time, for example, the machine learning device 10 selects a large number of similar images I by narrowing down the number of images I selected by the selection unit 12 in the same chunk C, and as a result, can avoid reduction in the accuracy of the machine learning. Further, the machine learning device 10 can improve processing speed by parallelizing the processing by the detection unit 11, the selection unit 12, and the like for each chunk C.

Further, the machine learning device 10 according to the present example embodiment further includes the generation unit 16 that generates the training data 160 by presenting the image I selected by the selection unit 12 to the user and then giving the label (correct answer information) input by the input operation by the user to the image I. Then, for example, as described above with reference to FIGS. 5 to 7, the generation unit 16 includes the user interface that implements the label input operation by the user. As a result, the machine learning device 10 can improve work efficiency of the label input operation by the user.

Note that the data to be processed by the machine learning device 10 is not limited to images (video) data such as the input moving image 100, and may be time-series data other than the image data. The machine learning device 10 may be, for example, a device that generates a learning model to be used when determining whether an abnormal sound is included in voice data generated from a facility to be monitored. Alternatively, the machine learning device 10 may be, for example, a device that generates a learning model to be used when determining whether an abnormality has occurred in time-series data representing a state (for example, a temperature, a current, a voltage, a reception state of a radio wave, or the like) of a facility to be monitored.

Second Example Embodiment

Figure 9:
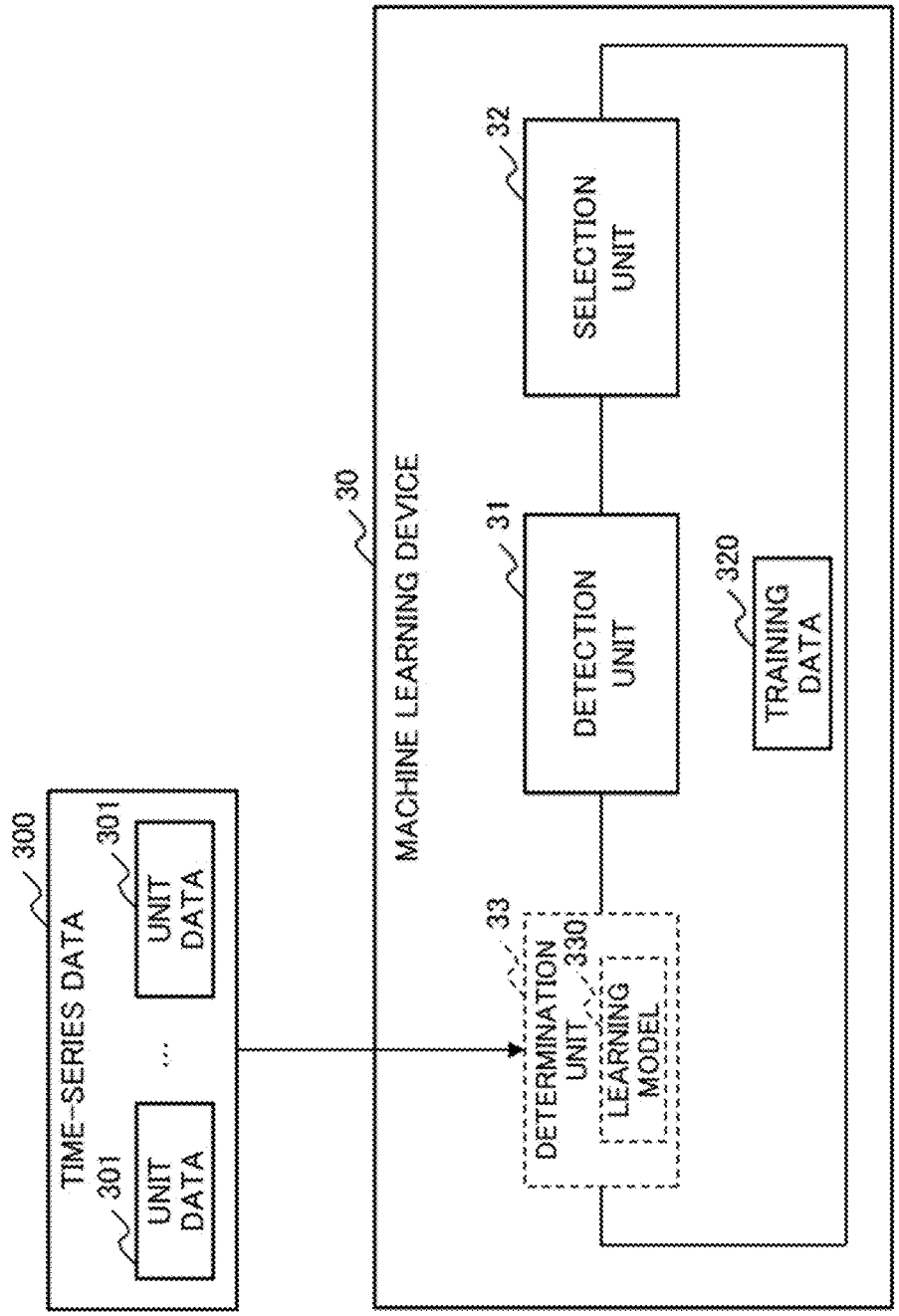
FIG. 9 is a block diagram illustrating a configuration of a machine learning device 30 according to a second example embodiment of the invention of the present application.

FIG. 9 is a block diagram illustrating a configuration of a machine learning device 30 according to a second example embodiment of the invention of the present application. The machine learning device 30 includes a detection unit 31 and a selection unit 32. Note that the detection unit 31 and the selection unit 32 are an example of a detection means and a selection means in order.

The detection unit 31 detects a loss of consistency with passage of time in a determination result for unit data 301 output from a determination unit 33 that has generated a learning model 330 to be used when making a predetermined determination for one or more unit data 301 constituting time-series data 300. Note that the determination unit 33 may be included in the machine learning device 30 or may be included in an external device capable of communicating with the machine learning device 30.

The time-series data 300 is, for example, data such as the input moving image 100 according to the first example embodiment, and in this case, unit data 301 is an image (frame) constituting the input moving image 100. For example, in the case where the unit data 301 is an image, the determination operation by the determination unit 33 may be an operation of determining whether a person has entered the monitoring target area as performed by the determination unit 13 according to the first example embodiment, or may be a determination operation different therefrom.

Similarly to the detection unit 11 according to the first example embodiment, the detection unit 31 detects the loss of temporal consistency in the determination result by the determination unit 33 using, for example, the determination result for the unit data 301 represented as a vector and Expression 3.

The selection unit 32 selects the unit data 301 to be used as training data 320 when the determination unit 33 updates the learning model 330 on the basis of the loss of temporal consistency detected by the detection unit 31. More specifically, similarly to the selection unit 12 according to the first example embodiment, the selection unit 32 gives a labeling priority to the unit data 301 on the basis of the loss of temporal consistency detected by the detection unit 31. Then, the selection unit 32 selects the unit data 301 having the labeling priority that satisfies a predetermined selection criterion such as the three selection criteria described in the first example embodiment.

The machine learning device 30 has a function corresponding to the generation unit 16 according to the first example embodiment, for example, thereby generating the training data 320 in which the label input by the user is given to the unit data 301 selected by the selection unit 32. Then, the determination unit 33 updates the learning model 330 using the training data 320.

The machine learning device 30 according to the present example embodiment can efficiently improve the accuracy of the learning model in the case of performing machine learning on the basis of time-series data. The reason is that the machine learning device 30 detects the loss of temporal consistency in the determination result output from the determination unit 33 that has generated the learning model 330 used when making a predetermined determination for the unit data 301 of the time-series data 300, and selects the unit data 301 to be used as the training data 320 when the determination unit 33 updates the learning model 330 on the basis of the detection result.

<Hardware Configuration Example>

Each unit in the machine learning device 10 illustrated in FIG. 1 or the machine learning device 30 illustrated in FIG. 9 in each of the above-described example embodiments can be implemented by dedicated hardware (HW) (electronic circuit). In FIGS. 1 and 9, at least the following configurations can be regarded as function (processing) units (software modules) of a software program:

the detection units 11 and 31,
the selection units 12 and 32,
the determination units 13 and 33,
the conversion unit 14,
the division unit 15, and
the generation unit 16.

Note that division of the units illustrated in the drawings is a configuration for convenience of description, and various configurations can be assumed at the time of implementation. An example of a hardware environment in this case will be described with reference to FIG. 10.

Figure 10:
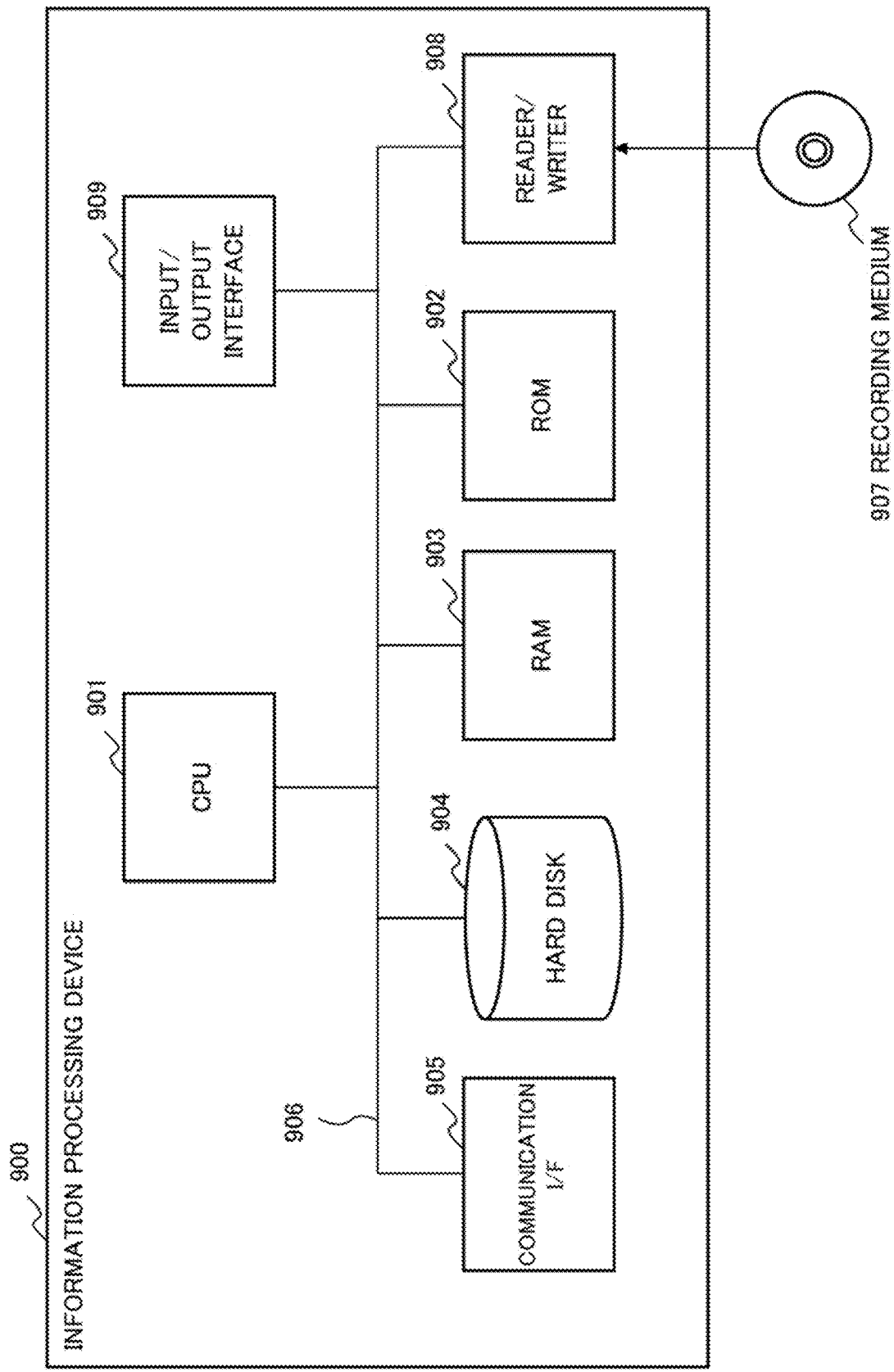
FIG. 10 is a block diagram illustrating a configuration of an information processing device 900 capable of executing the machine learning device 10 according to the first example embodiment or the machine learning device 30 according to the second example embodiment of the invention of the present application.

FIG. 10 is a diagram illustrating a configuration of an information processing device 900 (computer) capable of executing the machine learning device 10 according to the first example embodiment or the machine learning device 30 according to the second example embodiment of the invention of the present application. That is, FIG. 10 is a configuration of a computer (information processing device) capable of implementing the machine learning devices 10 and 30 illustrated in FIGS. 1 and 9, and represents a hardware environment capable of implementing the functions in the above-described example embodiments.

The information processing device 900 illustrated in FIG. 10 includes the following elements as components but may not include some of the following components:

a central processing unit (CPU) 901,
a read only memory (ROM) 902,
a random access memory (RAM) 903,
a hard disk (storage device) 904,
a communication interface 905 with an external device,
a bus 906 (communication line),
a reader/writer 908 capable of reading and writing data stored in a recording medium 907 such as a compact disc read only memory (CD-ROM), and
an input/output interface 909 of a monitor, a speaker, and a keyboard.

That is, the information processing device 900 including the above-described components is a general computer to which these components are connected via the bus 906. The information processing device 900 may include a plurality of the CPUs 901 or may include the CPU 901 configured by multiple cores. The information processing device 900 may include a graphical processing unit (GPU) (not illustrated) in addition to the CPU 901.

Then, the invention of the present application described using the above-described example embodiments as examples supplies a computer program capable of implementing the following functions to the information processing device 900 illustrated in FIG. 10. The functions are the above-described configurations in the block configuration diagrams (FIGS. 1 and 9) referred to in the description of the example embodiments or the functions of the flowcharts (FIGS. 8A and 8B). Thereafter, the invention of the present application is achieved by reading the computer program to the CPU 901 of the hardware and interpreting and executing the computer program. The computer program supplied to the device may be stored in a readable/writable volatile memory (RAM 903) or a non-volatile storage device such as the ROM 902 or the hard disk 904.

Further, in the above case, a general procedure can be adopted at present as a method of supplying the computer program to the hardware. Examples of the procedure include a method of installing the program in the device via various recording media 907 such as a CD-ROM, a method of downloading the program from the outside via a communication line such as the Internet, and the like. In such a case, the invention of the present application can be regarded as being configured by a code constituting the computer program or the recording medium 907 storing the code.

The invention of the present application has been described with reference to the above-described example embodiments as exemplary examples. However, the invention of the present application is not limited to the above-described example embodiments. That is, various modes that will be understood by those of ordinary skill in the art can be applied without departing from the scope of the invention of the present application as defined by the claims.

Some or all of the above example embodiments can be described as the following supplementary notes. However, the invention of the present application exemplarily described by each of the above-described example embodiments is not limited to below.

(Supplementary Note 1)

A machine learning device including:

a detection means configured to detect a loss of consistency with passage of time in a determination result for unit data, the determination result having been output from a determination means that has generated a learning model to be used when making a predetermined determination for one or more pieces of the unit data that constitute time-series data; and a selection means configured to select, based on a detection result by the detection means, the unit data to be used as training data when the determination means updates the learning model.

(Supplementary Note 2)

The machine learning device according to supplementary note 1, in which the selection means calculates priority of using the unit data as the training data based on the detection result, and selects the unit data to be used as the training data based on the priority.

(Supplementary Note 3)

The machine learning device according to supplementary note 2, further including:

a conversion means configured to perform predetermined conversion processing for the unit data and input the converted unit data to the determination means, in which the detection means detects the loss of consistency associated with the conversion processing in the determination result for the unit data by the determination means.

(Supplementary Note 4)

The machine learning device according to supplementary note 3, in which, in a case where the unit data represents an image, the conversion means performs at least one of translation, rotation, color tone conversion, or partial missing as the predetermined conversion processing.

(Supplementary Note 5)

The machine learning device according to supplementary note 3 or 4, in which the selection means calculates a sum of weighted values of a first value indicating the loss of consistency with passage of time and a second value indicating the loss of consistency associated with the conversion processing in the determination result for the unit data, the first value and the second value being indicated by the detection results by the detection means.

(Supplementary Note 6)

The machine learning device according to any one of supplementary notes 2 to 5, in which the detection means calculates a distance between a first vector representing the determination result for specific unit data among a predetermined set of the unit data and a second vector representing an average of the determination results for the unit data in the predetermined set excluding the specific unit data as a value representing the loss of consistency with passage of time.

(Supplementary Note 7)

The machine learning device according to any one of supplementary notes 2 to 6, in which the selection means selects the unit data having the priority that is equal to or higher than a threshold value.

(Supplementary Note 8)

The machine learning device according to any one of supplementary notes 2 to 6, in which the selection means selects the unit data in order of the priority from the unit data having the highest priority in such a way that a ratio of the unit data to be selected to the entire unit data becomes equal to or less than a predetermined value.

(Supplementary Note 9)

The machine learning device according to any one of supplementary notes 2 to 6, in which the selection means selects the unit data in order of the priority from the unit data having the highest priority in such a way that a number of the unit data to be selected becomes equal to or less than a predetermined value.

(Supplementary Note 10)

The machine learning device according to any one of supplementary notes 1 to 9, further including:

a division means configured to divide the time-series data into a plurality of temporally consecutive chunks, in which the detection means detects, for each of the chunks, the loss of consistency with passage of time in the determination result for the unit data, and the selection means selects the unit data to be used as the training data for each of the chunks.

(Supplementary Note 11)

The machine learning device according to supplementary note 10, in which the division means divides the time-series data into the chunks based on an occurrence status of an event related to the predetermined determination in the time-series data.

(Supplementary Note 12)

The machine learning device according to any one of supplementary notes 1 to 11, further including:

a generation means configured to generate the training data by presenting the unit data selected by the selection means to a user and then providing correct answer information input by an input operation by the user to the unit data.

(Supplementary Note 13)

The machine learning device according to supplementary note 12, in which the generation means presents, to the user, a position on a time axis of one or more pieces of the unit data selected by the selection means and a provision status of the correct answer information for the one or more pieces of unit data.

(Supplementary Note 14)

The machine learning device according to supplementary note 12 or 13, in which the generation means sequentially displays images each representing each of the one or more pieces of unit data selected by the selection means on a display screen according to a display criterion, and accepts an input operation by the user to select one of the displayed one or more pieces of unit data.

(Supplementary Note 15)

The machine learning device according to supplementary note 14, in which the generation means uses, as the display criterion, a time-series order, or an order of the priority of using the unit data as the training data based on the detection result.

(Supplementary Note 16)

The machine learning device according to any one of supplementary notes 1 to 15, further including:

the determination means.

(Supplementary Note 17)

A machine learning method including:

by an information processing device, detecting a loss of consistency with passage of time in a determination result for unit data, the determination result having been output from a determination means that has generated a learning model to be used when making a predetermined determination for one or more pieces of the unit data that constitute time-series data; and selecting, based on a detection result of the loss of consistency, the unit data to be used as training data when the determination means updates the learning model.

(Supplementary Note 18)

A recording medium storing a machine learning program for causing a computer to execute:

detection processing of detecting a loss of consistency with passage of time in a determination result for unit data, the determination result having been output from a determination means that has generated a learning model to be used when making a predetermined determination for one or more pieces of the unit data that constitute time-series data; and selection processing of selecting, based on a detection result of the detection processing, the unit data to be used as training data when the determination means updates the learning model.

REFERENCE SIGNS LIST 10 machine learning device
100 input moving image
11 detection unit
12 selection unit
13 determination unit
130 learning model
14 conversion unit
15 division unit
16 generation unit
160 training data
20 management terminal device
200 display screen
30 machine learning device
300 time-series data
301 unit data
31 detection unit
32 selection unit
320 training data
33 determination unit
330 learning model
900 information processing device
901 CPU
902 ROM
903 RAM
904 hard disk (storage device)
905 communication interface
906 bus
907 recording medium
908 reader/writer
909 input/output interface

What is claimed is:

1. A machine learning device comprising:
at least one memory storing a computer program; and
at least one processor configured to execute the computer program to
detect a loss of consistency with passage of time in a determination result for unit data, the determination result having been output from a learning model to be used when making a predetermined determination for one or more pieces of the unit data that constitute time-series data;
select, based on a detection result of the loss of consistency, the unit data to be used as training data;
generate data to control a displayed screen for adding a label corresponding to the selected the unit data; and
update the learning model using the selected unit data and the label.

2. The machine learning device according to claim 1, wherein the processor is configured to execute the computer program to
calculate priority of using the unit data as the training data based on the detection result, and select the unit data to be used as the training data based on the priority.

3. The machine learning device according to claim 2, wherein the processor is configured to execute the computer program to
perform predetermined conversion processing for the unit data and input the converted unit data to the learning model, and
detect the loss of consistency associated with the conversion processing in the determination result for the unit data by the learning model.

4. The machine learning device according to claim 3, wherein the processor is configured to execute the computer program to,
in a case where the unit data represents an image, perform at least one of translation, rotation, color tone conversion, or partial missing as the predetermined conversion processing.

5. The machine learning device according to claim 3, wherein the processor is configured to execute the computer program to
calculate a sum of weighted values of a first value indicating the loss of consistency with passage of time and a second value indicating the loss of consistency associated with the conversion processing in the determination result for the unit data, the first value and the second value being indicated by the detection results.

6. The machine learning device according to claim 2, wherein the processor is configured to execute the computer program to
calculate a distance between a first vector representing the determination result for specific unit data among a predetermined set of the unit data and a second vector representing an average of the determination results for the unit data in the predetermined set excluding the specific unit data as a value representing the loss of consistency with passage of time.

7. The machine learning device according to claim 2, wherein the processor is configured to execute the computer program to
select the unit data having the priority that is equal to or higher than a threshold value.

8. The machine learning device according to claim 2, wherein the processor is configured to execute the computer program to
select the unit data in order of the priority from the unit data having the highest priority in such a way that a ratio of the unit data to be selected to the entire unit data becomes equal to or less than a predetermined value.

9. The machine learning device according to claim 2, wherein the processor is configured to execute the computer program to
select the unit data in order of the priority from the unit data having the highest priority in such a way that a number of the unit data to be selected becomes equal to or less than a predetermined value.

10. The machine learning device according to claim 1, wherein the processor is configured to execute the computer program to
divide the time-series data into a plurality of temporally consecutive chunks,
detect, for each of the chunks, the loss of consistency with passage of time in the determination result for the unit data, and
select the unit data to be used as the training data for each of the chunks.

11. The machine learning device according to claim 10, wherein the processor is configured to execute the computer program to
  divide the time-series data into the chunks based on an occurrence status of an event related to the predetermined determination in the time-series data.

12. The machine learning device according to claim 1, wherein the processor is configured to execute the computer program to
  generate the training data by presenting the unit data being selected to a user and then providing correct answer information input by an input operation by the user to the unit data.

13. The machine learning device according to claim 12, wherein the processor is configured to execute the computer program to
  present, to the user, a position on a time axis of one or more pieces of the unit data being selected and a provision status of the correct answer information for the one or more pieces of unit data.

14. The machine learning device according to claim 12, wherein the processor is configured to execute the computer program to
  sequentially display images each representing each of the one or more pieces of unit data being selected on a display screen according to a display criterion, and accept an input operation by the user to select one of the displayed one or more pieces of unit data.

15. The machine learning device according to claim 14, wherein the processor is configured to execute the computer program to
  use, as the display criterion, a time-series order, or an order of the priority of using the unit data as the training data based on the detection result.

16. The machine learning device according to claim 1, wherein the at least one processor is further configured to execute the computer program to implement the learning model.

17. A machine learning method comprising:
by an information processing device,
  detecting a loss of consistency with passage of time in a determination result for unit data, the determination result having been output from a learning model to be used when making a predetermined determination for one or more pieces of the unit data that constitute time-series data;
  selecting, based on a detection result of the loss of consistency, the unit data to be used as training data;
  generating data to control a displayed screen for adding a label corresponding to the selected the unit data; and
  updating the learning model using the selected unit data and the label.

18. A non-transitory computer-readable recording medium storing a machine learning program for causing a computer to execute:
  detection processing of detecting a loss of consistency with passage of time in a determination result for unit data, the determination result having been output from a learning model to be used when making a predetermined determination for one or more pieces of the unit data that constitute time-series data;
  selection processing of selecting, based on a detection result of the detection processing, the unit data to be used as training data;
  generation processing of generating data to control a displayed screen for adding a label corresponding to the selected the unit data; and
  updating processing of updating the learning model using the selected unit data and the label.

* * * * *